(12) United States Patent
Suganuma et al.

(10) Patent No.: US 12,096,773 B2
(45) Date of Patent: Sep. 24, 2024

(54) HERBICIDAL COMPOSITION

(71) Applicant: ISHIHARA SANGYO KAISHA, LTD., Osaka (JP)

(72) Inventors: Taketo Suganuma, Osaka (JP); Atsushi Onishi, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 536 days.

(21) Appl. No.: 17/609,955

(22) PCT Filed: May 18, 2020

(86) PCT No.: PCT/JP2020/019674
§ 371 (c)(1),
(2) Date: Nov. 9, 2021

(87) PCT Pub. No.: WO2020/241360
PCT Pub. Date: Dec. 3, 2020

(65) Prior Publication Data
US 2022/0202018 A1 Jun. 30, 2022

(30) Foreign Application Priority Data
May 30, 2019 (JP) .................................. 2019-100978

(51) Int. Cl.
*A01N 47/06* (2006.01)
*A01N 43/54* (2006.01)

(52) U.S. Cl.
CPC ............. *A01N 47/06* (2013.01); *A01N 43/54* (2013.01)

(58) Field of Classification Search
CPC ...................................................... A01N 43/54
See application file for complete search history.

(56) References Cited

U.S. PATENT DOCUMENTS

| 8,492,310 | B2 | 7/2013 | Kikugawa et al. |
| 8,846,571 | B2 | 9/2014 | Kikugawa et al. |
| 10,206,399 | B2 | 2/2019 | Kim et al. |
| 10,442,807 | B2 | 10/2019 | Campbell et al. |
| 2011/0263427 | A1 | 10/2011 | Kikugawa et al. |
| 2013/0338004 | A1 | 12/2013 | Kikugawa et al. |
| 2015/0024940 | A1 | 1/2015 | Kim et al. |
| 2018/0215760 | A1 | 8/2018 | Campbell et al. |
| 2022/0211041 | A1* | 7/2022 | Suganuma ............. A01N 47/06 |

FOREIGN PATENT DOCUMENTS

| EP | 3061347 A1 | 8/2016 |
| EP | 3322293 B1 | 5/2021 |
| JP | 2010-159247 | 7/2010 |
| JP | 2015-514723 | 5/2015 |
| JP | 2018-016573 | 2/2018 |
| WO | 2010/067895 | 6/2010 |
| WO | 2013/154396 | 10/2013 |
| WO | 2016/182780 | 11/2016 |
| WO | 2017/011288 A1 | 1/2017 |
| WO | 2019/090816 | 5/2019 |

OTHER PUBLICATIONS

Osipitan et al. "Tolpyralate Applied Alone and With Atrazine for Weed Control in Corn," *Journal of Agricultural Science*, vol. 10, No. 10 (2018) pp. 32-39.
ISR issued in International Patent Application No. PCT/JP2020/019674, Jul. 14, 2020, English translation.
IPRP issued in International Application No. PCT/JP2020/019674, Nov. 16, 2021, English translation.
Lee Van Wychen, "WSSA Survey Ranks Most Common and Most Troublesome Weeds in Broadleaf Crops, Fruits and Vegetables", Weed Science Society of America, May 23, 2017, http://wssa.net/wp-content/uploads/WSSA-Weed-Survey-2017-05-19.pdf, retrieved May 20, 2019.
"The Global Market, Development, Trend of Herbicide (II)", Modern Agrochemicals, vol. 15, No. 3, issued Jun. 2016, pp. 1-5 and 31; Abstract.

* cited by examiner

*Primary Examiner* — Gina C Justice
(74) *Attorney, Agent, or Firm* — GREENBLUM & BERNSTEIN, P.L.C.

(57) ABSTRACT

At present, many herbicidal compositions have been developed and used, but it has been desired to develop a herbicidal composition having a wider herbicidal spectrum and high activity and thereby capable of controlling undesired plants. The present invention provides a herbicidal composition comprising as active ingredients (a) tolpyralate and (b) tiafenacil.

18 Claims, 1 Drawing Sheet

HERBICIDAL COMPOSITION

TECHNICAL FIELD

The present invention relates to a herbicidal composition comprising as active ingredients tolpyralate and tiafenacil. The present invention further relates to a method for controlling undesired plants, which comprises applying herbicidally effective amounts of tolpyralate and tiafenacil, to the undesired plants or to a place where they grow. The present invention further relates to a mixture containing as active ingredients tolpyralate and tiafenacil. The present invention still further relates to a combination of tolpyralate and tiafenacil as active ingredients.

BACKGROUND ART

Patent Document 1 discloses a herbicidal composition which comprises as active ingredients a benzoylpyrazole compound and other herbicidal compound, and Patent Document 2 discloses a herbicidal composition which comprises as active ingredients a uracil compound and other herbicidal compound. However, these Documents failed to specifically describe a combination of tolpyralate and tiafenacil of the present invention and its effects.

At present, many herbicidal compositions have been developed and used, but there are a variety of types of undesired plants e.g. weeds to be controlled, and e.g. by acquisition of resistance to herbicides, many of undesired plants are difficult to control.

For example, Amaranthus palmeri S. Watson, common lambsquarters (Chenopodium album L.), horseweed (Conyza canadensis(L.) Cron.), ivyleaf morningglory (Ipomoea hederacea Jacq.), pitted morningglory (Ipomoea lacunosa L.), tall morningglory (Ipomoea purpurea L.), waterhemp (Amaranthus tuberculatus (Moq.) J. D. Sauer) and common ragweed (Ambrosia elatior L.) are reported to have acquired resistance to herbicides in the U.S., and mentioned as weeds which are difficult to control in cultivation of broadleaf crops, fruits and vegetables (Non-Patent Document 1). Further, although Non-Patent Document 1 failed to specifically mention resistance to herbicides, it discloses yellow nutsedge (Cyperus esculentus L.), Kochia (Kochia scoparia L.), black nightshade (Solanum nigrum L.) and the like as weeds which are difficult to control in cultivation of broadleaf crops, fruits and vegetables, and further discloses velvetleaf (Abutilon theophrasti MEDIC.), giant foxtail (Setaria faberi Herrm.), barnyardgrass (Echinochloa crus-galli L.) and the like as common weeds in cultivation of broadleaf crops, fruits and vegetables.

PRIOR ART DOCUMENTS

Patent Documents

Patent Document 1: WO2010/067895
Patent Document 2: WO2013/154396

Non-Patent Documents

Non-Patent Document 1: URL:http://wssa.net/wp-content/uploads/WSSA-Weed-Survey-2017-05-19.pdf (retrieved on May 20, 2019)

DISCLOSURE OF INVENTION

Technical Problem

Accordingly, it has been desired to develop a herbicidal composition having a wider herbicidal spectrum and high activity and thereby capable of controlling various undesired plants. Further, in recent years, a technique to reduce the dose of the active ingredient has been desired in terms of the environmental load reduction to a place where the herbicide is applied or to a periphery thereof.

Solution to Problem

The present inventors have conducted extensive studies to achieve the above object and as a result, found a combination of herbicidally active ingredients with high applicability. That is, the present invention provides a herbicidal composition comprising as active ingredients (a) tolpyralate and (b) tiafenacil. The present invention further provides a method for controlling undesired plants, which comprises applying herbicidally effective amounts of (a) tolpyralate and (b) tiafenacil, to the undesired plants or to a place where they grow. The present invention further provides a mixture containing as active ingredients (a) tolpyralate and (b) tiafenacil. The present invention still further provides a combination of (a) tolpyralate and (b) tiafenacil as active ingredients. In this specification, the herbicidal composition, mixture and combination may sometimes be simply referred to as a herbicidal composition.

Advantageous Effects of Invention

The herbicidal composition of the present invention is capable of controlling a wide range of undesired plants emerging in non-agricultural fields or agricultural fields, and is capable of controlling undesired plants which have been considered to be difficult to control. Further, the herbicidal composition of the present invention is able to exert higher effects as compared with a case where the respective active ingredients are applied individually. As a result, the dose of (a) tolpyralate and/or (b) tiafenacil can be reduced, and thus the present invention is very useful in practical application.

DESCRIPTION OF EMBODIMENTS

The herbicidal composition of the present invention comprises as active ingredients (a) tolpyralate and (b) tiafenacil.

(a) Tolpyralate and (b) tiafenacil of the present invention may have salts, alkyl esters, hydrates, different crystal forms, various structural isomers, etc., and they are, of course, all included in the present invention.

In the present invention, the mixing weight ratio of (a) tolpyralate to (b) tiafenacil cannot generally be defined, as it varies depending upon various conditions such as the formulation types of the active ingredients to be mixed, the weather conditions, and the type and the growth state of the undesired plants to be controlled, but is usually from 1:0.001 to 1:100, preferably from 1:0.01 to 1:80, more preferably from 1:0.025 to 1:50, further preferably from 1:0.05 to 1:30, particularly preferably from 1:0.1 to 1:20.

In the present invention, the doses of (a) tolpyralate and (b) tiafenacil cannot generally be defined, as they vary depending upon various conditions such as the formulation types of the active ingredients to be mixed, the weather conditions, and the type and the growth state of the undesired plants to be controlled. The dose of (a) is usually from 0.01 to 300 g/ha, preferably from 0.05 to 200 g/ha, more preferably from 0.1 to 150 g/ha, further preferably from 0.5 to 100 g/ha, particularly preferably from 1 to 50 g/ha. The dose of (b) is usually from 0.01 to 400 g/ha, preferably from 0.05 to 300 g/ha, more preferably from 0.1 to 200 g/ha, further preferably from 0.5 to 100 g/ha, particularly preferably from 1 to 100 g/ha.

The herbicidal composition of the present invention has excellent herbicidal effects. The application range extends to non-agricultural fields such as forest land, farm roads, play grounds and factory sites and agricultural fields such as paddy fields, crop plant fields, orchards and mulberry fields. The method of applying the herbicidal composition of the present invention may suitably be selected from soil application, foliar application, water application, etc., and is particularly suitable for foliar application. Further, the application timing can optionally be selected from a wide range of from after the harvest to before the sowing.

The herbicidal composition of the present invention can be used for controlling various undesired plants or inhibiting their growth, including Gramineae such as barnyardgrass (*Echinochloa crus-galli* L., *Echinochloa oryzicola* vasing), crabgrass (*Digitaria sanguinalis* L., *Digitaria ischaemum* Muhl., *Digitaria adscendens* Henr., *Digitaria microbachne* Henr., *Digitaria horizontalis* Willd), green foxtail (*Setaria viridis* L.), giant foxtail (*Setaria faberi* Herrm.), yellow foxtail (*Setaria lutescens* Hubb.), goosegrass (*Eleusine indica* L.), wild oat (*Avena fatua* L.), johnsongrass (*Sorghum halepense* L.), quackgrass (*Agropyron repens* L.), alexandergrass (*Brachiaria plantaginea*), guineagrass (*Panicum maximum* Jacq.), paragrass (*Panicum purpurascens*), sprangletop (*Leptochloa chinensis*), red sprangletop (Leptochloapanicea), annual bluegrass (*Poa annua* L.), black grass (*Alopecurus myosuroides* Huds.), cholorado bluestem (*Agropyron tsukushiense* (Honda) Ohwi), broadleaf signalgrass (*Brachiaria platyphylla* Nash), southern sandbur (*Cenchrus echinatus* L.), italian ryegrass (*Lolium multiflorum* Lam.), bermudagrass (*Cynodon dactylon* Pers.), violet crabgrass (*Digitaria violascens* Link), knotgrass (*Paspalum distichum* L.), little quakinggrass (*Briza minor* L.), sweet vernalgrass (*Anthoxanthum odoratum* L.), fall *Panicum* (*Panicum dichotomiflorum* Michx), shattercane (*Sorghum bicolor* (L.) Moench), and sloughgrass (*Beckmannia syzigachne*);

Cyperaceae such as rice flatsedge (*Cyperus iria* L.), purple nutsedge (*Cyperus rotundus* L.), yellow nutsedge (*Cyperus esculentus* L.), flatsedge (*Cyperus serotinus*), small-flower umbrellaplant (*Cyperus difformis*), slender spikerush (*Eleocharis acicularis*), water chestnut (*Eleocharis kuroguwai*), green *Kyllinga* (*Kyllinga brevifolia* Rottb. var. *Leiolepis*), Schoenoplectus nipponicus, cosmopolitan bulrush (*Bolboschoenus koshevnikovii*), amur *Cyperus* (*Cyperus microiria* Steud.), and rock bulrush (*Schoenoplectus juncoides* Palla.);

Alismataceae such as Japanese ribbon waparo (Sagittariapygmaea), arrow-head (*Sagittaria trifolia*), and narrowleaf waterplantain (*Alisma canaliculatum*);

Pontederiaceae such as *Monochoria* (*Monochoria vaginalis*), and *Monochoria* species (*Monochoria korsakowii*);

Lythraceae such as toothcup (*Rotala india*), and red stem (*Ammannia multiflora*);

Elatinaceae such as long stem waterwort (*Elatine triandra* SCHK.);

Malvaceae such as velvetleaf (*Abutilon theophrasti* MEDIC.), prickly *Sida* (*Sida spinosa* L.), volunteer cotton (*Gossypium hirsutum* L.), common mallow (*Malva neglecta* Wallr.), little mallow (*Malva parviflora* L.), and venice Mallow (*Hibiscus trionum* L.);

Asteraceae such as common cocklebur (*Xanthium strumarium* L.), common ragweed (*Ambrosia elatior* L.), thistle (*Breea setosa* (BIEB.) KITAM.), hairy *Galinsoga* (*Galinsoga ciliata* Blake), wild chamomile (*Matricaria chamomilla* L.), fales chamomile (*Tripleurospermum maritimum*(L.), mayweed chamomile (*Anthemis cotula* L.), hairy fleabane (*Conyza bonariensis*(L.) Cron.), tall fleabane (*Conyza sumatrensis*), tall goldenrod (*Solidago altissima* L.), Prickly lettuce (*Lactuca serriola* L.), philadelphia fleabane (*Erigeron philadelphicus* L.), annual fleabane (*Erigeron annuus* (L.) Pers.), common groundsel (*Senecio vulgaris* L.), giant ragweed (*Ambrosia trifida* L.), horseweed (*Conyza canadensis*(L.) Cron.), dandelion (*Taraxacum officinale*), devils beggarticks (*Bidens frondosa* L.), *Bidens* biternate (Lour.) Merr.et Sherff, hairy beggarticks (*Bidens pilosa* L.), narrow-leaf hawksbeard (*Crepis tectorum* L.), *Parthenium* (*Parthenium hysterophorus* L.), spiny sowthistle (*Sonchus asper* (L.) Hill), annual sowthistle (*Sonchus oleraceus* (L.) not Wall), common sunflower (*Helianthus annuus* L.), canada thistle (Circium arvense (L.) Scop.), and bristly starbur (*Acanthospermum hispidum* D.C.);

Solanaceae such as black nightshade (*Solanum nigrum* L.), jimsonweed (*Datura stramonium*), cutleaf groundcherry (*Physalis* angulate L. var. angulata), horsenettle (*Solanum carolinense* L.), cutleaf nightshade (*Solanum triflorum* Nutt.), eastern black nightshade (*Solanum ptycanthum* Dunal), and hairy nightshade (*Solanum sarrachoides* Sendth.);

Amaranthaceae such as slender amaranth (*Amaranthus viridis* L.), redroot pigweed (*Amaranthus retroflexus* L.), livid amaranth (*Amaranthus blitum* L.), *Achyranthes bidentata* Blume var. *Japonica* Miq., *Amaranthus palmeri* S. Watson, *Kochia* (*Kochia scoparia* L.), smooth pigweed (*Amaranthus hybridus* L.), slender amaranth (*Amaranthus viridis* L.), powell amaranth (*Amaranthus powellii* S. Watson), spiny amaranth (*Amaranthus spinosus* L.), clammy goosefoot (Dypsharina pumilio (R.Br.), common lambsquarters (*Chenopodium album* L.), *Chenopodium album* L. var. centrorubrum Makino), narrow-leaf lambsquarters (*Chenopodium pratericola* Rydb.), prostrate pigweed (*Amaranthus blitoides* S. Wats.), Russian thistle (*Kali tragus* (L.) Scop.), and waterhemp (*Amaranthus tuberculatus* (Moq.) J. D. Sauer);

Polygonaceae such as pale smartweed (*Persicaria lapathifolia*(L.) Delarbre var. lapathifolia, *Persicaria lapathifolia*(L.) Delarbre var. Incana (Roth) H. Hara), ladysthumb (*Polygonum persicaria* L.), wild buckwheat (*Polygonum convolvulus* L.), knotweed (*Polygonum aviculare* L.), Japanese knotweed (*Fallopia japonica*(Houtt.) Ronse Decr. var. *Japonica*), *Persicaria longiseta* (Bruiln) Kitag., red sores (*Rumex acetosella* L. subsp. pyrenaicus), *Persicaria thunbergii*, *Persicaria nepalensis*(Meisn.) H. Gross, and *Rumex japonicus* Houtt;

Brassicaceae such as flexuous bittercress (*Cardamine flexuosa* WITH.), shepherd's-purse (*Capsella bursa-pastoris* Medik.), indian mustard (*Brassica juncea*

Czern.), *Rorippa indica* (L.), marsh yellowcress (*Rorippa palustris*(L.), volunteer canola (*Brassica* spp. L.), smallseed falseflax (*Camelina microcarpa* Andrz. ex DC.), fixweed (*Descurainia sophia* (L.) Webb ex Prantl), Black mustard (*Brassica nigra* L.), tumble mustard (*Sisymbrium altissimum* L.), wild mustard (*Sinapis arvensis* L.), field pennycress (*Thlaspi arvense* L.), london rocket (*Sisymbrium irio* L.), and pinnate tansymustard (*Descurainia pinnata* (Walt.) Britt.);

Convolvulaceae such as tall morningglory (*Ipomoea purpurea* L.), field bindweed (*Calystegia arvensis* L.), ivyleaf morningglory (*Ipomoea hederacea* Jacq.), entire leaf morningglory (*Ipomoea hederacea* var. integriuscula), palm leaf morningglory (*Ipomoea wrightii* Gray), and pitted morningglory (*Ipomoea lacunosa* L.);

Portulacaceae such as common purslane (*Portulaca oleracea* L.);

Fabaceae such as sicklepod (*Cassia obtusifolia* L.), red clover (*Trifolium pretense* L.), narrowleaf vetch (*Vicia sativa* L. subso. nigra (L.), Ehrh.var.segetalis (Thuill.) Ser.), white clover (*Trifolium repens* L.), tiny vetch (*Vicia* hirsute (L.), *Medicago sativa* L., black medic (*Medicago lupulina* L.), common *Lespedeza* (*Kummerowia striata*(Thunb.) Schindl), smallhop clover (*Trifolium dubium* Sibth), birdsfoot trefoil (*Lotus corniculatus* L. var. japonicus Regel), Florida beggar weed (*Desmodium tortuosum* (Sw.) DC.), hemp *Sesbania* (*Sesbania herbacea* (Mill.) McVaugh), and Pennsylvania smartweed (*Persicaria pensylvanica* (L.) M. Gomez); Caryophyllaceae such as common chickweed (*Stellaria media* L.), water starwort (*Stellaria aquatica* (L.)), sticky chickweed (*Cerastium glomeratum* Thuill.), *Sagina japonica*(Se.) Ohwi), *Stellaria uliginosa* Murray var. undulata, and cowcockle (*Vaccaria hispanica* (Mill.) Rauschert);

Lamiaceae such as henbit (*Lamium amplexicaule* L.) and purple deadnettle (*Lamium purpureum* L.);

Rubiaceae such as catchweed (*Galium spurium* L.), bedstraw catchweed (*Galium aparine* L.), and florida pusley (*Richardia scabra* L.);

Euphorbiaceae such as threeseeded copperleaf (*Acalypha australis* L.) spotted spurge (*Euphorbia maculate* L.), texasweed (*Caperonia palustris* (L.) A.St.-Hil.), and virginia copperleaf (*Acalypha* virniginica L.);

Commelinaceae such as common asiatic dayflower (*Commelina communis* L.);

Linderniaceae such as false pimpernel (*Lindernia procumbens*), false pimpernel (*Lindernia dubia* (L.) Pennell subsp. major Pennell), false pimpernel (*Lindernia dubia* (L.) Pennell subsp. dubia), and *Lindernia micrantha* D. Don;

Plantaginaceae such as *Dopatrium* (*Dopatrium junceum*), *Gratiola japonica* Miq, *Plantago asiatica* L., persian speedwell (*Veronica persica* Poir.), and corn speedwell (*Veronica arvensis* L.);

Molluginaceae such as Carpetweed (*Mollugo verticillata* L.); Onagraceae such as cutleaf eveningprimrose (*Oenothera laciniata* Hill), and willowweed (*Epilobium ciliatum* Raf.);

Geraniaceae such as Redstem filaree (*Erodium cicutarium* (L.) L'Her. ex Aiton);

Apiaceae such as Poison hemlock (*Conium maculatum* L.);

Urticaceae such as Burning nettle (*Urtica urens* L.);

Zygophyllaceae such as puncturevine (*Tribulus terrestris* L.);

Cucurbitaceae such as Burcucumber (*Sicyos angulatus* L.); and the like.

The herbicidal composition of the present invention is particularly useful for controlling undesired plants or inhibiting their growth, including Gramineae such as barnyardgrass (*Echinochloa crus-galli* L., *Echinochloa oryzicola* vasing.), crabgrass (*Digitaria sanguinalis* L., *Digitaria ischaemum* Muhl; *Digitaria adscendens* Henr., *Digitaria microbachne* Henr., *Digitaria horizontalis* Willd.), giant foxtail (*Setaria faberi* Herrm.), goosegrass (*Eleusine indica* L.), wild oat (*Avena fatua* L.), sprangletop (*Leptochloa chinensis*), annual bluegrass (*Poa annus* L.), black grass (*Alopecurus myosuroides* Huds.), italian ryegrass (*Lolium multiflorum* Lam.), violet crabgrass (*Digitaria violascens* Link), fall *Panicum* (*Panicum dichotomiflorum* Michx), and sloughgrass (*Beckmannia syzigachne*);

Cyperaceae such as purple nutsedge (*Cyperus rotundus* L.), yellow nutsedge (*Cyperus esculentus* L.), and green *Kyllinga* (*Kyllinga brevifolia* Rottb. var. *Leiolepis*);

Malvaceae such as velvetleaf (*Abutilon theophrasti* MEDIC.);

Asteraceae such as common ragweed (*Ambrosia elatior* L.), hairy *Galinsoga* (*Galinsoga ciliata* Blake), tall fleabane (*Conyza sumatrensis*), philadelphia fleabane (*Erigeron philadelphicus* L.), horseweed (*Conyza canadensis*(L.) Cron.) and dandelion (*Taraxacum officinale*);

Solanaceae such as black nightshade (*Solanum nigrum* L.);

Amaranthaceae such as redroot pigweed (*Amaranthus retroflexus* L.), livid amaranth (*Amaranthus blitum* L.), *Amaranthus palmeri* S. Watson, *Kochia* (*Kochia scoparia* L.), common lambsquarters (*Chenopodium album* L.), *Chenopodium album* L. var. centrorubrum Makino, and waterhemp (*Amaranthus tuberculatus* (Moq.) J. D. Sauer);

Polygonaceae such as pale smartweed (*Persicaria lapathifolia*(L.) Delarbre var. lapathifolia, *Persicaria lapathifolia*(L.) Delarbre var. Incana (Roth) H. Hara), *Persicaria longiseta* (Bruiln) Kitag., and *Persicaria nepalensis*(Meisn.) H.Gross;

Brassicaceae such as flexuous bittercress (*Cardamine flexuosa* WITH.), shepherd's-purse (*Capsella bursa-pastoris* Medik.), and marsh yellowcress (*Rorippa palustris*(L.));

Convolvulaceae such as tall morningglory (*Ipomoea purpurea* L.), ivyleaf morningglory (*Ipomoea hederacea* Jacq.), and pitted morningglory (*Ipomoea lacunosa* L.);

Portulacaceae such as common purslane (*Portulaca oleracea* L.);

Fabaceae such as narrowleaf vetch (*Vicia sativa* L. subso. nigra (L.), Ehrh.var.segetalis (Thuill.) Ser.), and common *lespedeza* (*Kummerowia striata*(Thunb.) Schindl);

Caryophyllaceae such as common chickweed (*Stellaria media* L.), and sticky chickweed (*Cerastium glomeratum* Thuill.);

Lamiaceae such as henbit (*Lamium amplexicaule* L.);

Rubiaceae such as catchweed (*Galium spurium* L.);

Commelinaceae such as common asiatic dayflower (*Commelina communis* L.);

Plantaginaceae such as persian speedwell (*Veronica persica* Poir.); and the like, preferably, Gramineae, Cyperaceae, Malvaceae, Asteraceae, Solanaceae, Amaranthaceae, Convolvulaceae, and the like, more preferably Gramineae, Asteraceae, Amaranthaceae, Convolvulaceae, and the like, further preferably Asteraceae, particularly preferably horseweed (*Conyza canadensis*(L.) Cron.).

The herbicidal composition of the present invention can be used for controlling the above undesired plants or inhibiting their growth in cultivation of useful crops such as lawn, soybean (*Glycine max* (L.) Merrill), alfalfa (*Medicago sativa*), chickpea (*Cicer arietinum* L.), Fieldpea (*Pisum sativum* L.), Lentil (*Lens culinaris* Medikus), cotton (*Gossypium* spp.), wheat (*Triticum aestivum* (L.) Thell.), rice (*Oryza sativa* L.), barley (*Hordeum vulgare* L.), rye (*Secale cereale* L.), oat (*Avena sativa* L.), corn (*Zea mays* L.), sorghum (*Sorghum* spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*)). Accordingly, the herbicidal composition of the present invention is preferably used in a place where the above useful crops grow.

The herbicidal composition of the present invention is preferably used particularly in a place where useful crops such as lawn, soybean, cotton, wheat, rice, corn, rape, rapeseed, sunflower, sugar beet, sugarcane, peanut, flax, tobacco and coffee grow, especially in a place where lawn, wheat, rice, corn and the like grow.

The useful crops in the present invention include plants having, imparted by classical breeding methods, resistance to a herbicide, for example, a HPPD inhibitor such as isoxaflutole; an ALS inhibitor such as imazethapyr or thifensulfuron-methyl; an EPSP synthase inhibitor such as glyphosate; a glutamine synthase inhibitor such as glufosinate; an acetyl CoA carboxylase inhibitor such as sethoxydim; bromoxynil; dicamba; or 2,4-D. The useful crops may, for example, be specifically imidazolinone herbicide resistant corn and canola (tradename: Clearfield™); and STS soybean resistant to sulfonylurea ALS inhibitor type herbicides.

The useful crops in the present invention include transgenic plants generated by gene modification. Examples of the transgenic plants include herbicide-resistant transgenic plants, noxious insect-resistant transgenic plants, transgenic plants relating to plant components, and phytopathogen-resistant transgenic plants. Further, the useful crops of the present invention include stacked varieties having useful characters of such transgenic plants combined.

The herbicidal composition of the present invention can be effectively used for selectively controlling undesired plants or inhibiting their growth in cultivation of various transgenic plants of the above useful crops (such as soybean, cotton, rapeseed and corn).

The herbicide-resistant transgenic plants include glyphosate-resistant corn, soybean, cotton, rapeseed and sugar beet, glufosinate-resistant corn, soybean, cotton and rapeseed, and bromoxynil-resistant cotton.

The noxious insect-resistant transgenic plants include, for example, plants which have acquired the ability to synthesize e.g. toxins known to be synthesized by the genus *Bacillus*. Toxins synthesized by the transgenic plants impart to the plants resistance particularly to Coleoptera insects, Hemiptera insects, Diptera insects, Lepidoptera insects and nematodes.

The above toxins include insecticidal proteins derived from *Bacillus cereus* and *Bacillus popilliae*; δ-endotoxins derived from *Bacillus thuringiensis*, such as Cry1Ab, Cry1Ac, Cry1F, Cry1Fa2, Cry2Ab, Cry3A, Cry3Bb1 and Cry9C; insecticidal proteins such as VIP1, VIP2, VIP3 and VIP3A; insecticidal proteins derived from nematodes; toxins produced by animals, such as scorpion toxin, spider toxin, bee toxin and insect-specific neurotoxin; filamentous fungi toxin; plant lectin; agglutinin; protease inhibitors such as trypsin inhibitor, serine protease inhibitor, patatin, cystatin and papain inhibitor; ribosome-inactivating proteins (RIP) such as ricin, corn-RIP, abrin, luffin, saporin and bryodin; steroid metabolizing enzymes such as 3-hydroxysteroid oxidase, ecdysteroid-UDP-glucosyltransferase and cholesterol oxidase; ecdysone inhibitor; HMG-CoA reductase; ion channel blockers such as sodium channel blocker and calcium channel blocker; juvenile hormone esterase; diuretic hormone receptor; stilbene synthase; bibenzyl synthase; chitinase; and glucanase. Further, such toxins include hybrid toxins of δ-endotoxin proteins such as Cry1Ab, Cry1Ac, Cry1F, Cry1Fa2, Cry2Ab, Cry3A, Cry3Bb1, Cry9C, Cry34Ab and Cry35Ab, and insecticidal proteins such as VIP1, VIP2, VIP3 and VIP3A, toxins lacking part thereof, and modified toxins.

The transgenic plants relating to plant components include plants having imparted oil component modified character or amino acid content increased character.

The phytopathogen-resistant transgenic plants include plants having imparted the ability to produce anti-pathogen substances with selective action.

The transgenic plants are not particularly limited and may, for example, be specifically corn, soybean, cotton, rapeseed and sugar beet varieties resistant to glyphosate (tradename: RoundupReady™, Agrisure™, Gly-Tol™); corn, soybean, cotton and rapeseed varieties resistant to glufosinate (tradename: LibertyLink™); cotton variety resistant to bromoxynil (tradename: BXN); corn and soybean varieties resistant to both glyphosate and ALS inhibitors (tradename: Optimum™, GAT™); imidazolinone compound resistant variety (tradename: IMI™); corn variety expressing Cry1Ab toxin (tradename: YieldGard™); corn variety expressing Cry3Bb1 toxin (tradename: YieldGard Rootworm™); corn variety expressing Cry1Ab and Cry3Bb1 toxins (tradename: YieldGard Plus™); corn variety expressing Cry1Fa2 toxin and phosphinothricin N-acetyltransferase (PAT) for imparting resistance to glufosinate (tradename: Herculex I™); cotton variety expressing Cry1Ac toxin (tradename: NuCOTN33B™, Bollgard I™); cotton variety expressing Cry1Ac and Cry2Ab toxin (tradename: Bollgard II™); cotton variety expressing VIP toxin (tradename: VIPCOT™); corn variety expressing Cry1Fa2 toxin and phosphinothricin N-acetyltransferase (PAT) for imparting resistance to glufosinate (Herculex I™); variety having GA21 glyphosate-resistant character (tradename: NatureGard Agrisure GT Advantage™); variety having Bt11 corn borer (CB) character (tradename: Agrisure CB Advantage™); low linolenic acid soybean having reduced linolenic acid content (tradename: VISTIVE™); and corn variety having increased lysine or oil content.

The herbicidal composition of the present invention, which comprises the above specific (a) tolpyralate and (b) tiafenacil in combination, exerts, as described in the aftermentioned Examples, as compared with a case where the respective active ingredients are applied individually, higher effects, which last over a long period of time. Thus, it is very useful in practical application, for example, in an application where the effects of the herbicidal composition may decrease by rainfall after the application or by the influence of the temperature, etc.

In the present invention, in addition to (a) tolpyralate and (b) tiafenacil, as the case requires, other herbicidal compound may be mixed and used. Such other herbicidal compound may suitably be selected from among various known herbicidal compounds, considering the application of the herbicidal composition, and the type and the growth state of the undesired plants to be controlled. Further, the herbicidal composition of the present invention may be mixed with or used in combination with a fungicide, an antibiotic, a plant hormone, an insecticide, a fertilizer and a safener, whereby more excellent effects or function may be obtained in some cases. Such other herbicidal compound includes, for example, the following compounds (common names), and one or two or more may properly be selected.

(1) Compounds which are believed to exhibit herbicidal effects by disturbing hormone activities of plants, such as a phenoxy compound such as 2,4-D, 2,4-D-butotyl, 2,4-D-butyl, 2,4-D-dimethylammonium, 2,4-D-diolamine, 2,4-D-ethyl, 2,4-D-2-ethylhexyl, 2,4-D-isobutyl, 2,4-D-isoctyl, 2,4-D-isopropyl, 2,4-D-isopropylammonium, 2,4-D-sodium, 2,4-D-isopropanolammonium, 2,4-D-trolamine, 2,4-DB, 2,4-DB-butyl, 2,4-DB-dimethylammonium, 2,4-DB-isoctyl, 2,4-DB-potassium, 2,4-DB-sodium, 2,4-D choline salt, dichlorprop, dichlorprop-butotyl, dichlorprop-dimethylammonium, dichlorprop-isoctyl, dichlorprop-potassium, dichlorprop-P, dichlorprop-P-dimethylammonium, dichlorprop-P-potassium, dichlorprop-P-sodium, MCPA, MCPA-butotyl, MCPA-dimethylammonium, MCPA-2-ethylhexyl, MCPA-potassium, MCPA-sodium, MCPA-thioethyl, MCPB, MCPB-ethyl, MCPB-sodium, mecoprop, mecoprop-butotyl, mecoprop-sodium, mecoprop-P, mecoprop-P-butotyl, mecoprop-P-dimethylammonium, mecoprop-P-2-ethylhexyl, mecoprop-P-potassium, naproanilide, clomeprop, or HIA-1; an aromatic carboxylic acid compound such as 2,3,6-TBA, dicamba, dicamba-butotyl, dicamba-diglycolamine, dicamba-dimethylammonium, dicamba-diolamine, dicamba-isopropylammonium, dicamba-potassium, dicamba-sodium, picloram, picloram-dimethylammonium, picloram-isoctyl, picloram-potassium, picloram-triisopropanolammonium, picloram-triisopropylammonium, picloram-trolamine, triclopyr, triclopyr-butotyl, triclopyr-triethylammonium, clopyralid, clopyralid-olamine, clopyralid-potassium, clopyralid-triisopropanolammonium, aminopyralid, aminocyclopyrachlor, halauxifen, halauxifen-methyl, or DAS-534; and naptalam, naptalam-sodium, benazolin, benazolin-ethyl, quinclorac, quinmerac, diflufenzopyr, diflufenzopyr-sodium, fluroxypyr, fluroxypyr-2-butoxy-1-methylethyl, fluroxypyr-meptyl, chloroflurenol, chloroflurenol-methyl, or clacyfos.

(2) Compounds which are believed to exhibit herbicidal effects by inhibiting photosynthesis of plants, such as a urea compound such as chlorotoluron, diuron, fluometuron, linuron, isoproturon, metobenzuron, tebuthiuron, dimefuron, isouron, karbutilate, methabenzthiazuron, metoxuron, methobromuron, monolinuron, neburon, siduron, terbumeton or trietazine; a triazine compound such as simazine, atrazine, atratone, simetryn, prometryn, dimethametryn, hexazinone, metribuzin, terbuthylazine, cyanazine, ametryn, cybutryne, terbutryn, propazine, metamitron, or prometon; a uracil compound such as bromacil, bromacil-lithium, lenacil or terbacil; an anilide compound such as propanil, cypromid or tethupyrolimet; a carbamate compound such as swep, desmedipham or phenmedipham; a hydroxybenzonitrile compound such as bromoxynil, bromoxynil-octanoate, bromoxynil-heptanoate, ioxynil, ioxynil-octanoate, ioxynil-potassium or ioxynil-sodium; and pyridate, bentazone, bentazone-sodium, amicarbazone, methazole, pentanochlor or phenmedipham.

(3) Quaternary ammonium salt compound such as paraquat or diquat, which is believed to be converted to free radicals by itself to form active oxygen in the plant and show rapid herbicidal efficacy.

(4) Compounds which are believed to exhibit herbicidal effects by inhibiting chlorophyll biosynthesis of plants and abnormally accumulating a photosensitizing peroxide substance in the plant, such as a diphenylether compound such as nitrofen, chlomethoxyfen, bifenox, acifluorfen, acifluorfen-sodium, fomesafen, fomesafen-sodium, oxyfluorfen, lactofen, aclonifen, ethoxyfen-ethyl, fluoroglycofen-ethyl or fluoroglycofen; a cyclic imide compound such as chlorphthalim, flumioxazin, flumiclorac, flumiclorac-pentyl, cinidon-ethyl, fluthiacet-methyl, or EK-5385; and oxadiargyl, oxadiazon, sulfentrazone, carfentrazone-ethyl, thidiazimin, pentoxazone, azafenidin, isopropazole, pyraflufen-ethyl, benzfendizone, butafenacil, saflufenacil, epyrifenacil, fluazolate, profluazol, flufenpyr-ethyl, bencarbazone, pyraclonil, cyclopyranil, trifludimoxazin, HNPC-B4047, IR-6396, EK-5439, EK-5498, SYN-523, or a compound disclosed in WO2008/008763 (FMC CORPORATION).

(5) Compounds which are believed to exhibit herbicidal effects characterized by bleaching activities by inhibiting chromogenesis of plants such as carotenoids, such as a pyridazinone compound such as norflurazon, chloridazon or metflurazon; a pyrazole compound such as pyrazolynate, pyrazoxyfen, benzofenap, topramezone, cypyrafluone or bipyrazone; and amitrole, fluridone, flurtamone, diflufenican, methoxyphenone, clomazone, bixlozone, mesotrione, tembotrione, tefuryltrione, fenquinotrione, cyclopyrimorate, difenzoquat, difenzoquat-metilsulfate, isoxachlortole, benzobicyclon, bicyclopyrone, picolinafen, beflubutamid, ketospiradox or ketospiradox-potassium.

(6) Compounds which are believed to exhibit herbicidal effects by inhibiting a fatty acid biosynthesis of plants, such as an aryloxyphenoxypropionic acid compound such as diclofop-methyl, diclofop, pyriphenop-sodium, fluazifop-butyl, fluazifop, fluazifop-P, fluazifop-P-butyl, haloxyfop-methyl, haloxyfop, haloxyfop-etotyl, haloxyfop-P, haloxyfop-P-methyl, quizalofop-ethyl, quizalofop-P, quizalofop-P-ethyl, quizalofop-P-tefuryl, cyhalofop-butyl, fenoxaprop-ethyl, fenoxaprop-P, fenoxaprop-P-ethyl, clodinafop-propargyl, clodinafop, propaquizafop, HNPC-A8169 or SYP-1924; a cyclohexanedione compound such as alloxydim-sodium, alloxydim, clethodim, sethoxydim, tralkoxydim, butroxydim, tepraloxydim, profoxydim or cycloxydim; and a phenylpyrazoline compound such as pinoxaden.

(7) Compounds which are believed to exhibit herbicidal effects by inhibiting an amino acid biosynthesis of plants, such as a sulfonylurea compound such as chlorimuron-ethyl, chlorimuron, sulfometuron-methyl, sulfometuron, primisulfuron-methyl, primisulfuron, bensulfuron-methyl, bensulfuron, chlorsulfuron, metsulfuron-methyl, metsulfuron, cinosulfuron, pyrazosulfuron-ethyl, pyrazosulfuron, flazasulfuron, rimsulfuron, nicosulfuron, imazosulfuron, flucetosulfuron, cyclosulfamuron, prosulfuron, flupyrsulfuron-methyl-sodium, flupyrsulfuron, triflusulfuron-methyl, triflusulfuron, halosulfuron-methyl, halosulfuron, thifensulfuron-methyl, thifensulfuron, ethoxysulfuron, oxasulfuron, ethametsulfuron, ethametsulfuron-methyl, iodosulfuron, iodosulfuron-methyl-sodium, sulfosulfuron, triasulfuron, tribenuron-methyl, tribenuron, tritosulfuron, foramsulfuron, trifloxysulfuron, trifloxysulfuron-sodium, mesosulfuron-methyl, mesosulfuron, orthosulfamuron, amidosulfuron, azimsulfuron, propyrisulfuron, metazosulfuron, methiopyrsulfuron, monosulfuron-methyl, orsosulfuron, iofensulfuron or iofensulfuron-sodium; a triazolopyrimidinesulfonamide compound such as flumetsulam, metosulam, dimesulfazet, diclosulam, cloransulam-methyl, florasulam, penoxsulam or pyroxsulam; an imidazolinone compound such as imazapyr, imazapyr-isopropylammonium, imazethapyr, imazethapyr-ammonium, imazaquin, imazaquin-ammonium, imazamox, imazamox-ammonium, imazamethabenz, imazamethabenz-methyl or imazapic; a pyrimidinylsalicylic acid compound such as pyrithiobac-sodium, bispyribac-sodium, pyriminobac-methyl, pyribenzoxim, pyriftalid, pyrimisulfan, or triafamone; a sulfonylaminocarbonyltriazolinone compound such as flucarbazone, flucarbazone-sodium, propoxycarbazone-sodium, propoxycarbazone, or thiencarbazone-methyl; and glyphosate, glyphosate-sodium, glyphosate-potassium, glyphosate-ammonium, glyphosate-diammonium, glyphosate-isopropylammonium, glyphosate-trimesium, glyphosate-sesquisodium, glufosinate, glufosinate-ammonium, glufosinate-P, glufosinate-P-ammonium, glufosinate-P-sodium, bilanafos, bilanafos-sodium or cinmethylin.

(8) Compounds which are believed to exhibit herbicidal effects by inhibiting cell mitoses of plants, such as a dinitroaniline compound such as trifluralin, oryzalin, nitralin, pendimethalin, ethalfluralin, benfluralin, prodiamine, butralin or dinitramine; an amide compound such as bensulide, napropamide, napropamide-M, propyzamide, pronamide or beflubutamid-M; an organic phosphorus compound such as amiprofos-methyl, butamifos, anilofos or piperophos; a phenyl carbamate compound such as propham, chlorpropham, barban or carbetamide; a cumylamine compound such as daimuron, cumyluron, bromobutide or methyldymron; and asulam, asulam-sodium, dithiopyr, thiazopyr, chlorthal-dimethyl, chlorthal, diphenamid, flamprop-M-methyl, flamprop-M, or flamprop-M-isopropyl.

(9) Compounds which are believed to exhibit herbicidal effects by inhibiting protein biosynthesis or lipid biosynthesis of plants, such as a chloroacetamide compound such as alachlor, metazachlor, butachlor, pretilachlor, metolachlor, S-metolachlor, thenylchlor, pethoxamid, acetochlor, propachlor, dimethenamide, dimethenamide-P, propisochlor or dimethachlor; a thiocarbamate compound such as molinate, dimepiperate, pyributicarb, EPTC, butylate, vernolate, pebulate, cycloate, prosulfocarb, esprocarb, thiobencarb, diallate, tri-allate or orbencarb; and etobenzanid, mefenacet, flufenacet, tridiphane, fentrazamide, oxaziclomefone, benfuresate, pyroxasulfone, dalapon, dalapon-sodium, TCA-sodium or trichloroacetic acid.

(10) Compounds which are believed to exhibit herbicidal effects by inhibiting a cellulose biosynthesis of plants, such as dichlobenil, triaziflam, indaziflam, flupoxam, or isoxaben.

(11) MSMA, DSMA, CMA, endothall, endothall-dipotassium, endothall-sodium, endothall-mono(N,N-dimethylalkylammonium), ethofumesate, sodium chlorate, pelargonic acid, nonanoic acid, fosamine, fosamine-ammonium, ipfencarbazone, aclolein, ammonium sulfamate, borax, chloroacetic acid, sodium chloroacetate, cyanamide, methylarsonic acid, dimethylarsinic acid, sodium dimethylarsinate, dinoterb, dinoterb-ammonium, dinoterb-diolamine, dinoterb-acetate, DNOC, ferrous sulfate, flupropanate, flupropanate-sodium, mefluidide, mefluidide-diolamine, metam, metam-ammonium, metam-potassium, metam-sodium, methyl isothiocyanate, pentachlorophenol, sodium pentachlorophenoxide, pentachlorophenol laurate, quinoclamine, sulfuric acid, urea sulfate, xanthinosin, herbimycin, unguinol, metatyrosine, sarmentine, thaxtomin A, mevalocidin, alpha-limonene, pyribambenz-propyl, pyribambenz-isopropyl, JS-913, KHG-23844, H-9201, SIOC-0163, SIOC-0171, SIOC-0172, SIOC-0285, SIOC-0426, SIOC-H-057, ZJ-0166, ZJ-1835, ZJ-0453, ZJ-0777, ZJ-0862, a compound disclosed in WO2008/096398 (Kumiai Chemical).

(12) Those which are believed to exhibit herbicidal effects by being parasitic on plants, such as *Xanthomonas campestris*, Epicoccosirus nematosorus, Epicoccosirus nematosperus, *Exserohilum* monoseras, or *Drechslera* monoceras.

One or more compounds may properly be selected from among the above other herbicidal compounds. Said other herbicidal compounds are not limited to the above-exemplified compounds.

With respect to application of the herbicidal composition of the present invention, application to undesired plants or application to a place where they grow (either before or after emerging of the plants) may optionally be selected. Further, (a) tolpyralate and (b) tiafenacil may separately be formulated so that they are mixed for use at the time of application, or they may be formulated together, followed by application. As examples of a specific application method, the following may be mentioned.

1. (a) Tolpyralate and (b) tiafenacil are formulated together, and the formulation is applied as it is.

2. (a) Tolpyralate and (b) tiafenacil are formulated together, the formulation is diluted to a predetermined concentration with e.g. water, and as the case requires, an adjuvant (such as a surfactant, a vegetable oil or a mineral oil) is added for application.

3. (a) Tolpyralate and (b) tiafenacil are separately formulated and applied as they are.

4. (a) Tolpyralate and (b) tiafenacil are separately formulated, and they are diluted to a predetermined concentration with e.g. water, and as the case requires, an adjuvant (such as a surfactant, a vegetable oil or a mineral oil) is added for application.

5. (a) Tolpyralate and (b) tiafenacil are separately formulated, and the formulations are mixed when diluted to a predetermined concentration with e.g. water, and as the case requires, an adjuvant (such as a surfactant, a vegetable oil or a mineral oil) is added for application.

The herbicidal composition of the present invention may be prepared by mixing (a) tolpyralate and (b) tiafenacil, as active ingredients, with various additives in accordance with conventional formulation methods for agricultural chemicals, and applied in the form of various formulations such as dusts, granules, water dispersible granules, wettable powders, tablets, pills, capsules (including a formulation packaged by a water soluble film), water-based suspensions, oil-based suspensions, microemulsions, suspoemulsions, water soluble powders, emulsifiable concentrates, soluble concentrates or pastes. It may be formed into any formulation which is commonly used in this field, so long as the object of the present invention is thereby met. At the time of the formulation, (a) tolpyralate and (b) tiafenacil may be mixed together for the formulation, or they may be separately formulated.

The additives to be used for the formulation include, for example, a solid carrier such as diatomaceous earth, slaked lime, calcium carbonate, talc, white carbon, kaoline, bentonite, kaolinite, sericite, clay, sodium carbonate, sodium bicarbonate, mirabilite, zeolite or starch; a solvent such as water, toluene, xylene, solvent naphtha, dioxane, acetone, isophorone, methyl isobutyl ketone, chlorobenzene, cyclohexane, dimethyl sulfoxide, dimethylformamide, dimethylacetamide, N-methyl-2-pyrrolidone or an alcohol; an anionic surfactant or adjuvant such as a salt of fatty acid, a benzoate, an alkylsulfosuccinate, a dialkylsulfosuccinate, a polycarboxylate, a salt of alkylsulfuric acid ester, an alkyl sulfate, an alkylaryl sulfate, an alkyl diglycol ether sulfate, a salt of alcohol sulfuric acid ester, an alkyl sulfonate, an alkylaryl sulfonate, an aryl sulfonate, a lignin sulfonate, an alkyldiphenyl ether disulfonate, a polystyrene sulfonate, a salt of alkylphosphoric acid ester, an alkylaryl phosphate, a styrylaryl phosphate, a salt of polyoxyethylene alkyl ether sulfuric acid ester, a polyoxyethylene alkylaryl ether sulfate, a salt of polyoxyethylene alkylaryl ether sulfuric acid ester, a polyoxyethylene alkyl ether phosphate, a salt of polyoxyethylene alkylaryl phosphoric acid ester, a salt of polyoxyethylene aryl ether phosphoric acid ester, a naphthalene sulfonate condensed with formaldehyde or an alkylnaphthalene sulfonate condensed with formaldehyde; a nonionic surfactant or adjuvant such as a sorbitan fatty acid ester, a glycerin fatty acid ester, a fatty acid polyglyceride, a fatty acid alcohol polyglycol ether, acetylene glycol, acetylene alcohol, an oxyalkylene block polymer, a polyoxyethylene alkyl ether, a polyoxyethylene alkylaryl ether, a polyoxyethylene styrylaryl ether, a polyoxyethylene glycol alkyl ether, polyethylene glycol, a polyoxyethylene fatty acid ester, a polyoxyethylene sorbitan fatty acid ester, a polyoxyethylene glycerin fatty acid ester, a polyoxyethylene hydrogenated castor oil or a polyoxypropylene fatty acid ester; and a vegetable oil or mineral oil such as olive oil, kapok oil, castor oil, palm oil, Camellia oil, coconut oil, sesame oil, corn oil, rice bran oil, peanut oil, cottonseed oil, soybean oil, rapeseed oil, linseed oil, tung oil or liquid paraffins. These additives may suitably be selected for use alone or in combination as a mixture of two or more of them, so long as the object of the present invention is met. Further, various additives commonly used, such as a filler, a thickener, an anti-settling agent, an anti-freezing agent, a dispersion stabilizer, a safener, an anti-mold agent, a blowing agent, a disintegrator and a binder, may be used. The mixing weight ratio of the total of (a) tolpyralate and (b) tiafenacil to such various additives is from about 0.1:99.9 to about 95:5, preferably from 0.1:99.9 to 95:5, more preferably from about 0.2:99.8 to about 85:15, further preferably from 0.2: 99.8 to 85:15.

Now, examples of preferred embodiments of the present invention will be given below, but it should be understood that the present invention is by no means restricted thereto.

[1] A herbicidal composition (or mixture) comprising as active ingredients (a) tolpyralate and (b) tiafenacil.

[2] The herbicidal composition (or mixture) according to [1], wherein the mixing weight ratio of (a) to (b) is from 1:0.001 to 1:100.

[3] The herbicidal composition (or mixture) according to [1], wherein the mixing weight ratio of (a) to (b) is from 1:0.1 to 1:20.

[4] The herbicidal composition (or mixture) according to any one of [1] to [3], for controlling undesired plants or inhibiting their growth, the undesired plants being selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Molluginaceae, Onagraceae, Geraniaceae, Apiaceae, Urticaceae, Zygophyllaceae and Cucurbitaceae.

[5] The herbicidal composition (or mixture) according to any one of [1] to [3], for controlling undesired plants or inhibiting their growth, the undesired plants being selected from the group consisting of Gramineae, Cyperaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Commelinaceae and Plantaginaceae.

[6] The herbicidal composition (or mixture) according to any one of [1] to [3], for controlling undesired plants or inhibiting their growth, the undesired plants being selected from the group consisting of Gramineae, Cyperaceae, Malvaceae, Asteraceae, Solanaceae, Amaranthaceae and Convolvulaceae.bot

[7] The herbicidal composition (or mixture) according to any one of [1] to [3], for controlling undesired plants or inhibiting their growth, the undesired plants being selected from the group consisting of Gramineae, Asteraceae, Amaranthaceae and Convolvulaceae.

[8] The herbicidal composition (or mixture) according to any one of [1] to [3], for controlling undesired plants or inhibiting their growth, the undesired plants being selected from the group consisting of Asteraceae.

[9] The herbicidal composition (or mixture) according to any one of [1] to [3], for controlling horseweed (*Conyza canadensis*(L.)Cron.) or inhibiting their growth.

[10] The herbicidal composition (or mixture) according to any one of [1] to [9], for use at a place where useful crops grow, the useful crops being selected from the group consisting of lawn, soybean (*Glycine max* (L.) Merrill), alfalfa (*Medicago sativa*), chickpea (*Cicer arietinum* L.), Fieldpea (*Pisum sativum* L.), Lentil (*Lens culinaris* Medikus), cotton (*Gossypium* spp.), wheat (*Triticum aestivum* (L.) Thell.), rice (*Oryza sativa* L.), barley (*Hordeum vulgare* L.), rye (*Secale cereale* L.), oat (*Avena sativa* L.), corn (*Zea mays* L.), sorghum (*Sorghum* spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

[11] The herbicidal composition (or mixture) according to any one of [1] to [9], for use after the harvest, before the sowing or before the budding of useful crops selected from the group consisting of lawn, soybean (*Glycine max* (L.) Merrill), alfalfa (*Medicago sativa*), chickpea (*Cicer arietinum* L.), Fieldpea (*Pisum sativum* L.), Lentil (*Lens culinaris* Medikus), cotton (*Gossypium* spp.), wheat (*Triticum aestivum* (L.) Thell.), rice (*Oryza sativa* L.), barley (*Hordeum vulgare* L.), rye (*Secale cereale* L.), oat (*Avena sativa* L.), corn (*Zea mays* L.), sorghum (*Sorghum* spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

[12] A method for controlling undesired plants, which comprises applying herbicidally effective amounts of (a) tolpyralate and (b) tiafenacil, to the undesired plants or to a place where they grow.

[13] The method according to [12], wherein (a) and (b) are applied in a mixing weight ratio of (a) to (b) of from 1:0.001 to 1:100.

[14] The method according to [12], wherein (a) and (b) are applied in a mixing weight ratio of (a) to (b) of from 1:0.1 to 1:20.

[15] The method according to any one of [12] to [14], wherein (a) is applied in an amount of from 0.01 to 300 g/ha, and (b) is applied in an amount of from 0.01 to 400 g/ha.

[16] The method according to any one of [12] to [14], wherein (a) is applied in an amount of from 1 to 50 g/ha, and (b) is applied in an amount of from 1 to 100 g/ha.

[17] The method according to any one of [12] to [16], wherein the undesired plants are selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Molluginaceae, Onagraceae, Geraniaceae, Apiaceae, Urticaceae, Zygophyllaceae and Cucurbitaceae.

[18] The method according to any one of [12] to [16], wherein the undesired plants are selected from the group consisting of Gramineae, Cyperaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Commelinaceae and Plantaginaceae.

[19] The method according to any one of [12] to [16], wherein the undesired plants are selected from the group consisting of Gramineae, Cyperaceae, Malvaceae, Asteraceae, Solanaceae, Amaranthaceae and Convolvulaceae.

[20] The method according to any one of [12] to [16], wherein the undesired plants are selected from the group consisting of Gramineae, Asteraceae, Amaranthaceae and Convolvulaceae.

[21] The method according to any one of [12] to [16], wherein the undesired plants are Asteraceae.

[22] The method according to any one of [12] to [16], wherein the undesired plants are horseweed (*Conyza canadensis*(L.)Cron.).

[23] The method according to any one of [12] to [22], wherein the place where the undesired plants grow is a place where useful crops grow, the useful crops being selected from the group consisting of lawn, soybean (*Glycine max* (L.) Merrill), alfalfa (*Medicago sativa*), chickpea (*Cicer arietinum* L.), Fieldpea (*Pisum sativum* L.), Lentil (*Lens culinaris* Medikus), cotton (*Gossypium* spp.), wheat (*Triticum aestivum* (L.) Thell.), rice (*Oryza sativa* L.), barley (*Hordeum vulgare* L.), rye (*Secale cereale* L.), oat (*Avena sativa* L.), corn (*Zea mays* L.), sorghum (*Sorghum* spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

[24] The method according to any one of [12] to [22], wherein (a) tolpyralate and (b) tiafenacil are applied after the harvest, before the sowing or before the budding of useful crops selected from the group consisting of lawn, soybean (*Glycine max* (L.) Merrill), alfalfa (*Medicago sativa*), chickpea (*Cicer arietinum* L.), Fieldpea (*Pisum sativum* L.), Lentil (*Lens culinaris* Medikus), cotton (*Gossypium* spp.), wheat (*Triticum aestivum* (L.) Thell.), rice (*Oryza sativa* L.), barley (*Hordeum vulgare* L.), rye (*Secale cereale* L.), oat (*Avena sativa* L.), corn (*Zea mays* L.), sorghum (*Sorghum* spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

[25] A combination of (a) tolpyralate and (b) tiafenacil as active ingredients.

[26] The combination according to [25], wherein the mixing weight ratio of (a) to (b) is from 1:0.001 to 1:100.

[27] The combination according to [25], wherein the mixing weight ratio of (a) to (b) is from 1:0.1 to 1:20.

[28] The combination according to any one of [25] to [27], for controlling undesired plants or inhibiting their growth, the undesired plants being selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Molluginaceae, Onagraceae, Geraniaceae, Apiaceae, Urticaceae, Zygophyllaceae and Cucurbitaceae.

[29] The combination according to any one of [25] to [27], for controlling undesired plants or inhibiting their growth, the undesired plants being selected from the group consisting of Gramineae, Cyperaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Commelinaceae and Plantaginaceae.

[30] The combination according to any one of [25] to [27], for controlling undesired plants or inhibiting their growth, the undesired plants being selected from the group consisting of Gramineae, Cyperaceae, Malvaceae, Asteraceae, Solanaceae, Amaranthaceae and Convolvulaceae.

[31] The combination according to any one of [25] to [27], for controlling undesired plants or inhibiting their growth, the undesired plants being selected from the group consisting of Gramineae, Asteraceae, Amaranthaceae and Convolvulaceae.

[32] The combination according to any one of [25] to [27], for controlling undesired plants or inhibiting their growth, the undesired plants being selected from the group consisting of Asteraceae.

[33] The combination according to any one of [25] to [27], for controlling horseweed (*Conyza canadensis*(L.)Cron.) or inhibiting their growth.

[34] The combination according to any one of [25] to [33], for use at a place where useful crops grow, the useful crops being selected from the group consisting of lawn, soybean (*Glycine max* (L.) Merrill), alfalfa (*Medicago sativa*), chickpea (*Cicer arietinum* L.), Fieldpea (*Pisum sativum* L.), Lentil (*Lens culinaris* Medikus), cotton (*Gossypium* spp.), wheat (*Triticum aestivum* (L.) Thell.), rice (*Oryza sativa* L.), barley (*Hordeum vulgare* L.), rye (*Secale cereale* L.), oat (*Avena sativa* L.), corn (*Zea mays* L.), sorghum (*Sorghum* spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*)).

[35] The combination according to any one of [25] to [33], for use after the harvest, before the sowing or before the budding of useful crops selected from the group consisting of lawn, soybean (*Glycine max* (L.) Merrill), alfalfa (*Medicago sativa*), chickpea (*Cicer arietinum* L.), Fieldpea (*Pisum sativum* L.), Lentil (*Lens culinaris* Medikus), cotton (*Gossypium* spp.), wheat (*Triticum aestivum* (L.) Thell.), rice (*Oryza sativa* L.), barley (*Hordeum vulgare* L.), rye (*Secale cereale* L.), oat (*Avena sativa* L.), corn (*Zea mays* L.), sorghum (*Sorghum* spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis* hypogaea L.), flax (*Linum usitatissimum* L.), tobacco (*Nicotiana tabacum*, L.) and coffee (*Coffea arabica*).

EXAMPLES

Example 1

Upland field soil was put into a 1/1,000,000 hectare pot, and seeds of horseweed (*Conyza canadensis*(L.) Cron.) were sown. On the 73rd day after the sowing, a SC formulation including tolpyralate as an active ingredient and a SC formulation including tiafenacil as an active ingredient were diluted with water (in an amount corresponding to 200 L/ha) and 1 vol % of an adjuvant (tradename: Destiny HC, manufactured by Winfield Solutions, LLC.) was added, followed by foliar treatment to the horseweed (diameter: 12 to 15 cm) with an automatic boom sprayer. On the 21st day after the foliar treatment, the state of growth of the horseweed was visually observed, and the growth inhibition rate (measured value) was obtained in accordance with the evaluation criteria (Table 1).

Growth inhibition rate (%) =

0(equivalent to the non-treated area) to 100 (complete kill)

TABLE 1

| Compound | Dose (g/ha) | Growth inhibition rate (%) |
|---|---|---|
| Tolpyralate | 50 | 30 |
|  | 30 | 30 |
|  | 15 | 33 |
| Tiafenacil | 50 | 40 |
|  | 25 | 33 |
| Tolpyralate + tiafenacil | 50 + 25 | 80 |
|  | 30 + 25 | 83 |
|  | 50 + 50 | 88 |
|  | 30 + 50 | 91 |
|  | 15 + 25 | 87 |
|  | 15 + 50 | 81 |

Example 2

Upland field soil was put into a 1/1,000,000 hectare pot, and seeds of horseweed (*Conyza canadensis*(L.) Cron.) were sown. On the 80th day after the sowing, a SC formulation including tolpyralate as an active ingredient and a SC formulation including tiafenacil as an active ingredient were diluted with water (in an amount corresponding to 200 L/ha) and 1 vol % of an adjuvant (tradename: Destiny HC, manufactured by Winfield Solutions, LLC.) was added, followed by foliar treatment to the horseweed (diameter: 10 to 13 cm) with an automatic boom sprayer. On the 19th day after the foliar treatment, the state of growth of the horseweed was visually observed, and the growth inhibition rate was obtained in accordance with the evaluation criteria (Table 2).

Growth inhibition rate (%) =

0(equivalent to the non-treated area) to 100 (complete kill)

TABLE 2

| Compound | Dose (g/ha) | Growth inhibition rate (%) |
|---|---|---|
| Tolpyralate | 250 | 37 |
|  | 125 | 33 |
| Tiafenacil | 25 | 23 |
| Tolpyralate + tiafenacil | 250 + 25 | 77 |
|  | 125 + 25 | 75 |

Example 3

Figure 1:
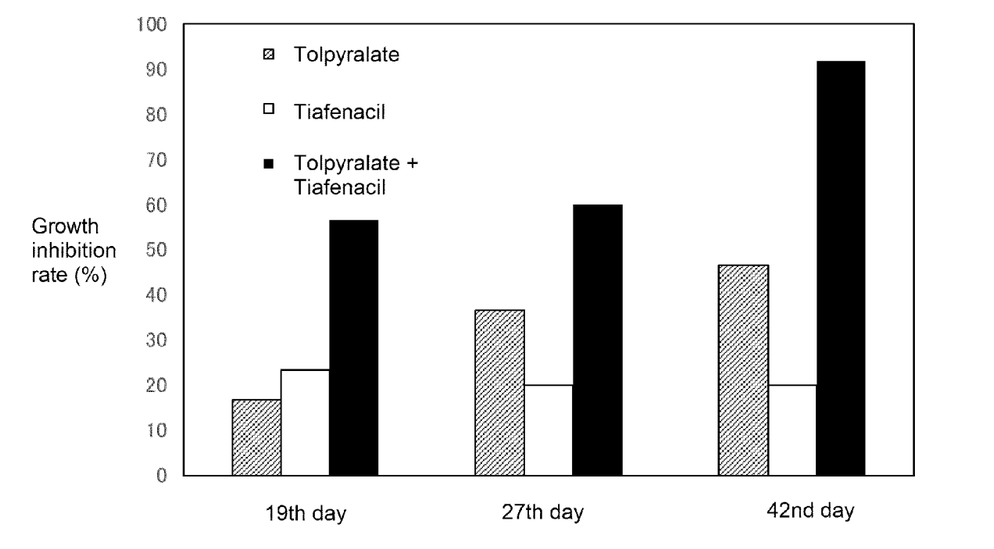
FIG. 1 illustrates growth inhibition rates of horseweed on the 19th, 27th and 42nd days after the treatment with tolpyralate (10 g/ha) alone, tiafenacil (50 g/ha) alone and tolpyralate (10 g/ha) and tiafenacil (50 g/ha) in combination.

Upland field soil was put into a 1/1,000,000 hectare pot, and seeds of horseweed (*Conyza canadensis*(L.) Cron.) were sown. On the 86th day after the sowing, a SC formulation including tolpyralate as an active ingredient and a SC formulation including tiafenacil as an active ingredient were diluted with water (in an amount corresponding to 200 L/ha) and 1 vol % of an adjuvant (tradename: Destiny HC, manufactured by Winfield Solutions, LLC.) was added, followed by foliar treatment to the horseweed (diameter: 10 to 13 cm) with an automatic boom sprayer. On the 19th, 27th and 42nd days after the foliar treatment, the state of growth of the horseweed was visually observed, and the growth inhibition rate was obtained in accordance with the evaluation criteria (Table 3).

Growth inhibition rate (%) =

0(equivalent to the non-treated area) to 100 (complete kill)

TABLE 3

| Compound | Dose (g/ha) | Growth inhibition rate (%) | | |
|---|---|---|---|---|
|  |  | 19th day | 27th day | 42nd day |
| Tolpyralate | 10 | 17 | 37 | 47 |
|  | 5 | 20 | 47 | 23 |
| Tiafenacil | 100 | 50 | 43 | 30 |
|  | 50 | 23 | 20 | 20 |
| Tolpyralate + tiafenacil | 10 + 50 | 57 | 60 | 92 |
|  | 5 + 50 | 53 | 70 | 78 |
|  | 5 + 100 | 67 | 57 | 85 |

In a case where tolpyralate or tiafenacil was used alone, no sufficient growth inhibition effect was obtained even on the 19th day after the foliar treatment. On the other hand, in a case where tolpyralate and tiafenacil were used in combination, new leaves were strongly bleached and the growth was inhibited up to 42nd day after the foliar treatment at any dose. It is found that the growth of the horseweed can be inhibited over a longer period of time as compared with a single use of tolpyralate or tiafenacil.

Example 4

Upland field soil was put into a 1/1,000,000 hectare pot, and seeds of black nightshade (*Solanum nigrum* L.), wild oat (*Avena fatua* L.) and dandelion (*Taraxacum officinale*) were sown. When the black nightshade reached 6 to 8 leaf stage, the wild oat reached 0.6 to 1.1 leaf stage, and the dandelion reached 6 to 11 leaf stage, a SC formulation including tolpyralate as an active ingredient and a SC formulation including tiafenacil as an active ingredient were diluted with water (in an amount corresponding to 300 L/ha) and 0.5 vol % of an adjuvant (tradename: Destiny HC, manufactured by Winfield Solutions, LLC.) was added, followed by foliar treatment to each plant with an automatic boom sprayer. On the 10th to 27th day after the foliar treatment, the state of growth of each plant was visually observed, and the growth inhibition rate was obtained in accordance with the evaluation criteria (Table 4).

Growth inhibition rate (%) =

0(equivalent to the non-treated area) to 100 (complete kill)

TABLE 4

| Compound | Dose (g/ha) | Growth inhibition rate (%) | | |
|---|---|---|---|---|
| | | Black nightshade (27th day) | Wild oat (21st day) | Dandelion (10th day) |
| Tolpyralate | 50 | 78 | 30 | 30 |
| | 30 | 79 | 28 | 30 |
| | 15 | 72 | 10 | 30 |
| Tiafenacil | 25 | 58 | 75 | 30 |
| Tolpyralate + tiafenacil | 50 + 25 | 99 | 88 | 85 |
| | 30 + 25 | 97 | 92 | 80 |
| | 15 + 25 | 98 | 87 | 70 |

Example 5

Upland field soil was put into a 1/1,000,000 hectare pot, and tubers of yellow nutsedge (*Cyperus esculentus* L.) were embedded. When the yellow nutsedge reached 3.5 to 4.5 leaf stage, a SC formulation including tolpyralate as an active ingredient and a SC formulation including tiafenacil as an active ingredient were diluted with water (in an amount corresponding to 300 L/ha) and 0.5 vol % of an adjuvant (tradename: Destiny HC, manufactured by Winfield Solutions, LLC.) was added, followed by foliar treatment to the plant with an automatic boom sprayer. On the 22nd day after the foliar treatment, the state of growth of the yellow nutsedge was visually observed, and the growth inhibition rate was obtained in accordance with the evaluation criteria (Table 5).

Growth inhibition rate (%) =

0(equivalent to the non-treated area) to 100 (complete kill)

TABLE 5

| Compound | Dose (g/ha) | Growth inhibition rate (%) Yellow nutsedge |
|---|---|---|
| Tolpyralate | 50 | 60 |
| | 30 | 50 |
| | 15 | 40 |
| Tiafenacil | 50 | 35 |
| Tolpyralate + tiafenacil | 50 + 50 | 90 |
| | 30 + 50 | 80 |
| | 15 + 50 | 85 |

Example 6

Upland field soil was put into a 1/1,000,000 hectare pot, and seeds of common ragweed (*Ambrosia elatior* L.) and Kochia (*Kochia scoparia* L.) were sown. When the common ragweed reached a height of 33 to 50 cm and the Kochia reached a height of 18 to 28 cm, a SC formulation including tolpyralate as an active ingredient and a SC formulation including tiafenacil as an active ingredient were diluted with water (in an amount corresponding to 300 L/ha) and 0.5 vol % of an adjuvant (tradename: Destiny HC, manufactured by Winfield Solutions, LLC.) was added, followed by foliar treatment to each plant with an automatic boom sprayer. On the 6th or 10th day after the foliar treatment, the state of growth of each plant was visually observed, and the growth inhibition rate was obtained in accordance with the evaluation criteria (Table 6).

Growth inhibition rate (%) =

0(equivalent to the non-treated area) to 100 (complete kill)

TABLE 6

| Compound | Dose (g/ha) | Growth inhibition rate (%) | |
|---|---|---|---|
| | | Common Ragweed (6th day) | Kochia (10th day) |
| Tolpyralate | 50 | 10 | 15 |
| | 30 | 15 | 20 |
| | 15 | 15 | 15 |
| Tiafenacil | 50 | 50 | 30 |
| | 25 | 50 | 30 |
| Tolpyralate + tiafenacil | 50 + 50 | 80 | 65 |
| | 30 + 50 | 75 | 70 |
| | 15 + 50 | 75 | 60 |
| | 50 + 25 | 85 | 70 |
| | 30 + 25 | 80 | 63 |
| | 15 + 25 | 75 | 70 |

Example 7

Upland field soil was put into a 1/1,000,000 hectare pot, and seeds of crabgrass (*Digitaria sanguinalis* L.), velvetleaf (*Abutilon theophrasti* MEDIC.) and ivyleaf morningglory (*Ipomoea hederacea* Jacq.) were sown. When the crabgrass reached 5.5 to 6.8 leaf stage, the velvetleaf reached 6.0 to 6.4 leaf stage, and the ivyleaf morningglory reached 3.3 to 4.5 leaf stage, a SC formulation including tolpyralate as an active ingredient and a SC formulation including tiafenacil as an active ingredient were diluted with water (in an amount corresponding to 300 L/ha) and 0.5 vol % of an adjuvant (tradename: Destiny HC, manufactured by Winfield Solutions, LLC.) was added, followed by foliar treatment to each plant with an automatic boom sprayer. On the 12th or 19th day after the foliar treatment, the state of growth of each plant was visually observed, and the growth inhibition rate was obtained in accordance with the evaluation criteria (Table 7).

Growth inhibition rate (%) =

0(equivalent to the non-treated area) to 100 (complete kill)

TABLE 1

| Compound | Dose (g/ha) | Growth inhibition rate (%) | | |
|---|---|---|---|---|
| | | Crabgrass (19th day) | Velvetleaf (12th day) | Ivyleaf morningglory (12th day) |
| Tolpyralate + tiafenacil | 50 + 50 | 99 | 90 | 98 |
| | 30 + 50 | 99 | 90 | 98 |
| | 15 + 50 | 99 | 90 | 98 |
| | 50 + 25 | 99 | 90 | 98 |
| | 30 + 25 | 98 | 90 | 98 |
| | 15 + 25 | 98 | 90 | 98 |

Example 8

Upland field soil was put into a 1/1,000,000 hectare pot, and seeds of goosegrass (*Eleusine indica* L.), barnyardgrass (*Echinochloa crus-galli* L.), giant foxtail (*Setaria faberi* Herrm.) and crabgrass (*Digitaria sanguinalis* L.) were sown. When the goosegrass reached 5.5 to 6.0 leaf stage, the barnyardgrass reached 4.5 to 5.0 leaf stage, the giant foxtail reached 4.0 to 5.0 leaf stage and the crabgrass reached 5.1 to 6.0 leaf stage, a SC formulation including tolpyralate as an active ingredient and a SC formulation including tiafenacil as an active ingredient were diluted with water (in an amount corresponding to 300 L/ha) and 0.5 vol % of an adjuvant (tradename: Destiny HC, manufactured by Winfield Solutions, LLC.) was added, followed by foliar treatment to each plant with an automatic boom sprayer. On the 5th to 18th day after the foliar treatment, the state of growth of each plant was visually observed, and the growth inhibition rate was obtained in accordance with the evaluation criteria (Table 8).

Growth inhibition rate (%)=0 (equivalent to the non-treated area) to 100 (complete kill)

TABLE 8

| Compound | Dose (g/ha) | Growth inhibition rate (%) | | | |
|---|---|---|---|---|---|
| | | Goose-grass (5th day) | Barnyard-grass (11th day) | Giant foxtail (7th day) | Crab-grass (18th day) |
| Tolpyralate | 5 | 23 | 40 | 40 | 50 |
| | 3 | 15 | 45 | 30 | 40 |
| | 1.5 | 15 | 45 | 10 | 30 |
| Tiafenacil | 2.5 | 77 | 30 | 80 | 30 |
| Tolpyralate + tiafenacil | 5 + 2.5 | 93 | 75 | 98 | 85 |
| | 3 + 2.5 | 92 | 75 | 95 | 75 |
| | 1.5 + 2.5 | 88 | 70 | 93 | 55 |

Example 9

Upland field soil was put into a 1/1,000,000 hectare pot, and seeds of redroot pigweed (*Amaranthus retroflexus* L.), *Kochia* (*Kochia scoparia* L.) and *Chenopodium album* L. var. centrorubrum Makino were sown. When the redroot pigweed reached a height of 14 to 22 cm, the *Kochia* reached a height of 16 to 24 cm and *Chenopodium album* L. var. centrorubrum Makino reached a height of 35 to 43 cm, a SC formulation including tolpyralate as an active ingredient and a SC formulation including tiafenacil as an active ingredient were diluted with water (in an amount corresponding to 300 L/ha) and 0.5 vol % of an adjuvant (tradename: Destiny HC, manufactured by Winfield Solutions, LLC.) was added, followed by foliar treatment to each plant with an automatic boom sprayer. On the 8th or 14th day after the foliar treatment, the state of growth of each plant was visually observed, and the growth inhibition rate was obtained in accordance with the evaluation criteria (Table 9).

Growth inhibition rate (%) =

0(equivalent to the non-treated area) to 100 (complete kill)

TABLE 9

| Compound | Dose (g/ha) | Growth inhibition rate (%) | | |
|---|---|---|---|---|
| | | Red root pigweed (8th day) | Kochia (14th day) | Chenopodium album L. var. centrorubrum Makino (14th day) |
| Tolpyralate | 5 | 30 | 25 | 15 |
| | 3 | 25 | 23 | 10 |
| | 1.5 | 23 | 10 | 10 |
| Tiafenacil | 2 | 65 | 23 | 30 |
| | 1 | 50 | 13 | 3 |
| Tolpyralate + tiafenacil | 5 + 2 | 88 | 70 | 60 |
| | 3 + 2 | 90 | 65 | 70 |
| | 1.5 + 2 | 83 | 58 | 55 |
| | 5 + 1 | 88 | 63 | 50 |
| | 3 + 1 | 88 | 50 | 50 |
| | 1.5 + 1 | 85 | 50 | 50 |

It is evident from Examples 1 to 9 (Tables 1 to 9) that the combination of tolpyralate and tiafenacil of the present invention has an excellent growth inhibition effect against various undesirable plants. Further, as shown in Examples 4 to 6, 8 and 9 (Tables 4 to 6, 8 and 9), it is found that the growth inhibition effect against various undesirable plants remarkably improves at a dose in a wide range when tolpyralate and tiafenacil are used in combination, even under conditions where no sufficient growth inhibition effect is obtained by a single use of tolpyralate or tiafenacil.

The entire disclosure of Japanese Patent Application No. 2019-100978 filed on May 30, 2019 including specification, claims, drawings and summary is incorporated herein by reference in its entirety.

The invention claimed is:

1. A herbicidal composition comprising as active ingredients (a) tolpyralate and (b) tiafenacil.

2. The herbicidal composition according to claim 1, wherein the mixing weight ratio of (a) to (b) is from 1:0.001 to 1:100.

3. The herbicidal composition according to claim 1, wherein the mixing weight ratio of (a) to (b) is from 1:0.1 to 1:20.

4. The herbicidal composition according to claim 1, for controlling undesired plants or inhibiting their growth, the undesired plants being selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Molluginaceae, Onagraceae, Geraniaceae, Apiaceae, Urticaceae, Zygophyllaceae and Cucurbitaceae.

5. The herbicidal composition according to claim 1, for controlling undesired plants or inhibiting their growth, the undesired plants being selected from the group consisting of Gramineae, Cyperaceae, Malvaceae, Asteraceae, Solanaceae, Amaranthaceae and Convolvulaceae.

6. The herbicidal composition according to claim 1, for controlling Asteraceae or inhibiting their growth.

7. The herbicidal composition according to claim 1, for use at a place where useful crops grow, the useful crops being selected from the group consisting of lawn, soybean (*Glycine max* (L.) Merrill), alfalfa (*Medicago sativa*), chickpea (*Cicer arietinum* L.), Fieldpea (*Pisum sativum* L.), Lentil (*Lens culinaris* Medikus), cotton (*Gossypium* spp.), wheat (*Triticum aestivum* (L.) Thell.), rice (*Oryza sativa* L.), barley (*Hordeum vulgare* L.), rye (*Secale cereale* L.), oat (*Avena sativa* L.), corn (*Zea mays* L.), sorghum (*Sorghum* spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

8. A method for controlling undesired plants, which comprises applying herbicidally effective amounts of (a) tolpyralate and (b) tiafenacil, to the undesired plants or to a place where they grow.

9. The method according to claim 8, wherein (a) and (b) are applied in a mixing weight ratio of (a) to (b) of from 1:0.001 to 1:100.

10. The method according to claim 8, wherein (a) and (b) are applied in a mixing weight ratio of (a) to (b) of from 1:0.1 to 1:20.

11. The method according to claim 8, wherein (a) is applied in an amount of from 0.01 to 300 g/ha, and (b) is applied in an amount of from 0.01 to 400 g/ha.

12. The method according to claim 8, wherein (a) is applied in an amount of from 1 to 50 g/ha, and (b) is applied in an amount of from 1 to 100 g/ha.

13. The method according to claim 8, wherein the undesired plants are selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Molluginaceae, Onagraceae, Geraniaceae, Apiaceae, Urticaceae, Zygophyllaceae and Cucurbitaceae.

14. The method according to claim 8, wherein the undesired plants are selected from the group consisting of Gramineae, Cyperaceae, Malvaceae, Asteraceae, Solanaceae, Amaranthaceae and Convolvulaceae.

15. The method according to claim 8, wherein the undesired plants are Asteraceae.

16. The method according to claim 8, wherein the place where the undesired plants grow is a place where useful crops grow, the useful crops being selected from the group consisting of lawn, soybean (*Glycine max* (L.) Merrill), alfalfa (*Medicago sativa*), chickpea (*Cicer arietinum* L.), Fieldpea (*Pisum sativum* L.), Lentil (*Lens culinaris* Medikus), cotton (*Gossypium* spp.), wheat (*Triticum aestivum* (L.) Thell.), rice (*Oryza sativa* L.), barley (*Hordeum vulgare* L.), rye (*Secale cereale* L.), oat (*Avena sativa* L.), corn (*Zea mays* L.), sorghum (*Sorghum* spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

17. A mixture containing as active ingredients (a) tolpyralate and (b) tiafenacil.

18. A combination of (a) tolpyralate and (b) tiafenacil as active ingredients.

\* \* \* \* \*